United States Patent [19]

Froberg et al.

[11] 4,029,489

[45] June 14, 1977

[54] METHOD OF AND APPARATUS FOR MELTING OF GLASS

[75] Inventors: Magnus L. Froberg, Granville; Charles M. Hohman, Newark, both of Ohio

[73] Assignee: Owens-Corning Fiberglas Corporation, Toledo, Ohio

[22] Filed: Feb. 17, 1976

[21] Appl. No.: 658,643

[52] U.S. Cl. .................................. 65/136; 65/135; 65/337; 65/345; 65/347
[51] Int. Cl.² ...................... C03B 5/02; C03B 5/04
[58] Field of Search ............ 65/134, 135, 136, 337, 65/345, 347, 335

[56] References Cited

UNITED STATES PATENTS

| | | | |
|---|---|---|---|
| 1,799,371 | 4/1931 | Hitner | 65/335 X |
| 1,880,541 | 10/1932 | Wadman | 65/135 |
| 1,893,060 | 1/1933 | Peiler | 65/134 |
| 3,127,262 | 3/1964 | Allman | 65/347 X |
| 3,574,585 | 4/1971 | Robertson et al. | 65/135 |

FOREIGN PATENTS OR APPLICATIONS 366,530  2/1932  United Kingdom ................ 65/335

*Primary Examiner*—Arthur D. Kellogg

*Attorney, Agent, or Firm*—John W. Overman; Charles F. Schroeder; David H. Wilson, Jr.

[57] ABSTRACT

A glass melting furnace in which glass can be heated by sources below its upper surface, as electrically by Joule effect, and by means above its upper surface, as by fossil fuel firing or by heat reflectors. A cold top melting mode is employed in the charging region of the furnace while the glass discharge region maintains an exposed molten, upper surface on the glass. In a disclosed embodiment a high crown over the charging region enables cold top melting and refining to be accomplished by Joule effect while flues and burner ports in that region are closed. A low crown, which may be adjustable in its height above the glass line, is provided over the discharge region to increase heating at the exposed, molten upper surface of the glass by reflection. Heating in the discharge region can be augmented by above surface heaters distributed across the crown. A flue in the discharge region carries gases from that region. The degree of heat flow from the discharge region to the charging region is controlled by an adjustable heat barrier. One form of barrier is a transverse wall mounted between the regions and arranged for adjustable elevation above the glass line. The degree of refinement of the glass in the discharge region permits use of the surface throat in furnaces where Joule effect heating provides the preponderant source of heat.

40 Claims, 8 Drawing Figures

METHOD OF AND APPARATUS FOR MELTING OF GLASS

BACKGROUND OF THE INVENTION

1. Field of the Invention

This invention relates to glass manufacturing and more particularly to improved apparatus and methods of melting glass.

2. Description of the Prior Art

Ecological and energy source considerations have brought the electrical melting and refining of glass to a position of significance in glass technology. Stack gases from fossil fuel fired glass melters contain both the products of combustion and gases evolved from the melting and refining of the glass constituents. It is desirable to minimize such gases. One approach which reduces the gases evolved from glass melting and refining is to employ Joule effect heating of molten glass and to maintain a blanket of thermally insulating glass batch on the upper surface of the molten glass. This type of operation has been termed "cold top" melting and refining. The continuous melting of glass by cold top processes can be considered to comprise charging batch at the top of the mass of glass constituents, melting the batch at its interface with the underlying molten glass, and withdrawing the glass at the bottom of the glass mass through a submerged passage or throat. Batch dust from the batch charging operation and from the passage of gases from the molten glass through the batch blanket can be a problem in cold top operation. Frequently, further refining and/or conditioning of the glass is required after it is withdrawn from the melting tank or region to eliminate gas which produces bubbles or seeds in the products formed.

In more common prior glass melting processes where fossil fuel firing has been employed, melting of the glass batch occurs at the upper surface of the mass of glass constituents and the glass batch added to the mass is ordinarily confined to a restricted portion of that upper surface until it is melted into the body of molten glass. Such melting reduces the amount of dusting of batch and increases the opportunity for the evolution of seed producing gas from the molten mass so that refining of the glass can be more complete in the melter. Glass can be withdrawn at the upper surface of the melt through a surface throat without entraining intolerable quantities of unmelted batch or inadequately refined glass.

Glass furnaces employed in commercial continuous melting processes include equipment and structure which exceed the life of the refractory structure of the glass tank and therefore can be reused. Conditions have dictated modifications toward a cold top type of operation even in the case of furnaces originally constructed for fossil fuel firing. In U.S. Pat. application Ser. No. 452,900 filed Mar. 20, 1974, now U.S. Pat. No. 3,885,945, in the names of Vernon C. Rees and Magnus L. Froberg entitled "Method of and Apparatus for Electrically Heating Molten Glass" glass melting and refining apparatus and techniques are disclosed which combine features of cold top operation and fossil fuel melting applicable to a furnace framework and auxiliary equipment configuration originally intended for fossil fuel melting and refining. In that arrangement the preponderant heat energy for melting and refining glass is derived from Joule effect heating developed between electrodes extending through the bottom of the glass tank and distributed thereover in a suitable array. The discharge end of the tank is operated under continuous melting conditions of production with a limited amount of augmenting heat applied from the upper surface of the glass constituents such that the upper surface in the glass issuing or discharge region is molten and thus sufficiently fluid to permit and even induce the evolution of gas from the glass prior to its discharge. Glass batch is charged in a charge region spaced from the discharge region and by virtue of the following batch being charged, the molten glass flow, and the flow of gas toward the free upper surface of molten glass, the batch floating on the molten glass advances across that surface as a thermal insulating blanket over a major portion of the molten glass to provide essentially cold top melting in that major portion of the tank. Under stable operation, the interface between the batch blanket and the molten glass at the exposed upper surface of the glass mass within the tank stabilized so that melting and preliminary refining occurred as a cold top operation while further refining is enhanced over that previously realized with fossil fuel fired refining. The glass composition can therefore be tailored to take advantage of the retention of constituents by the barrier of the batch blanket, such as those introduced for fluxing, for a greater portion of the time the glass is in a molten state. Less gas is evolved in the refining since smaller quantities of the material releasing the gas are utilized in the batch. Dusting is reduced since heat from the region in which a molten glass upper surface is exposed causes the upper surface of the batch blanket to crust. Stack gas temperature is substantially reduced and the heat loss of the system greatly reduced. This improved type of operation, which produces an exposed, molten, upper surface on a portion of the glass, a batch blanket over a preponderance of the exposed upper surface of the constituents in the tank, and a radiant leading edge on the batch blanket at its interface with the exposed molten, upper surface, has been termed "radiant leading edge operation".

An object of the present invention is to improve the process of and apparatus for the melting of glass.

Another object is to enhance radiant leading edge operation.

A third object is to control the location of the radiant leading edge in a glass tank and thereby control the refining of glass.

A further object is to increase the efficiency of heat utilization in glass melting furnaces.

A further object is to reduce the gas evolutoion and dusting from glass melting operations while enhancing the quality of the glass.

A sixth object is to facilitate the modification of existing (hydrocarbon) fossil fuel burning furnace facilities toward electric glass furnace facilities while realizing advantages from both forms of application of heat energy to continuous melting of glass.

A seventh object is to reduce or eliminate fossil fuel burners as heat sources in the discharge region of a glass melting furnace, particularly such a furnace operating in the radiant leading edge mode.

SUMMARY OF THE INVENTION

In accordance with the above objects, the present invention involves enhancing the heat concentration in the region of the upper surface of the glass constituent mass in the vicinity of the discharge from a glass tank, particularly a glass tank operated in a continuous melting and refining mode. Heat sufficient to maintain the exposed, upper surface of the glass molten in the discharge region is concentrated by a relfecting crown positioned closely proximate the upper surface of the glass constituents in that region. In the charging region a crown can be provided which is spaced a substantial distance above the exposed upper surface of the glass constituents. Joule effect heating can be the preponderant and in some instances the sole source of heat throughout the glass tank. In addition to the use of a low crown for the discharge region heat reflection and concentration, that concentration can be enhanced by employing a barrier to heat flow between the charging and the discharge region.

The charging region of the furnace is arranged for convenient heat-up and initial melting of glass by means of fossil fuel burners. More particularly, burner ports are provided in the side walls and the chamber has a flue to raise the temperature of starting materials such as cullet or batch to a temperature at which the molten glass resistivity is reduced to a level suitable for Joule effect heating. Upon stabilization of thermal conditions for Joule effect heating the flue and burner ports are closed in the charging region and a batch blanket is developed on the melt. The closed chamber militates against gas and dust escape.

One form of barrier disclosed is a movable pattern having its lower edge height above the exposed upper surface of the glass constituents adjustable. This controls the amount of heat flowing over the upper surface of the batch blanket in the charging region and thus the degree to which the radiant leading edge is melted back from the discharge region into the batch blanket.

Another arrangement is a crown for the discharge region which is oriented closer to the upper surface of the glass constituents proximate the charging region than it is in its portions more remote from the charging region. A planar and inclined crown is shown although a stepped crown might be used for this purpose.

Where fossil fuel burners are employed as aboveglass heat sources in the discharge region, swirl type burners are used having a flat flame spiralling around their axes and with their axes generally normal to the upper surface of the glass constituents. The heat source is thereby distributed between the crown and the upper surface of the glass without having its flame impinge on the glass. Where burners or other above glass heaters augment the heat reflected to the glass surface by the crown, the crown is positioned farther from that surface than where no such augmenting source is employed. In order to accommodate different degrees of heat reflection or application in the discharge region of the tank, as where pull rate is changed, the position of the radiant leading edge is to be changed, or where the glass line elevation is changed, embodiments are shown wherein the elevation of the furnace crown in the discharge region is adjustable. Relationships between heat flow and/or radiant leading edge location and the height of the bottom of the partition and/or height of the discharge region crown are disclosed.

DETAILED DESCRIPTION OF THE PREFERRED EMBODIMENT

Figure 1:
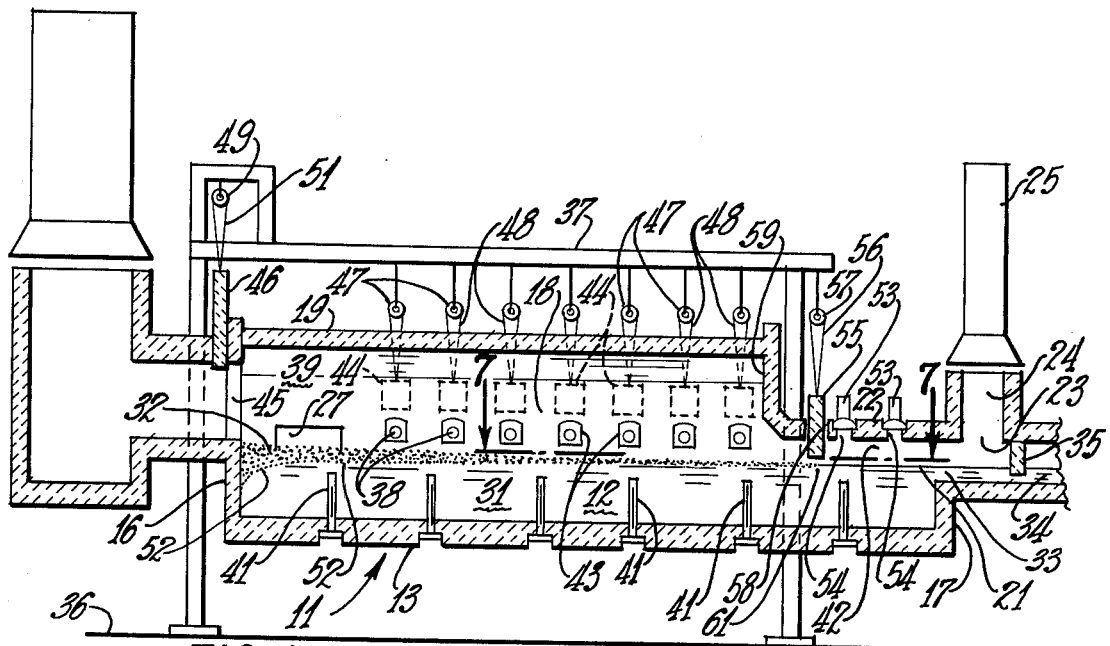
FIG. 1 is a sectioned side elevational view of a diagramatic representation of a continuous glass melting furnace according to this invention taken along the longitudinal centerline as shown by lines 1—1 of FIG. 2.

A furnace 11 for melting glass is shown in FIGS. 1 through 4 as comprising a receptacle for containing molten glass 31 up to a glass line 21 and glass batch 32 above at least a portion of that glass line. The receptacle is illustrated as a tank portion 12 including a bottom wall 13, side walls 14 and 15, rear end wall 16, and front end wall 17. Breast walls 18 support and arch roof 19 above tank 12 and glass line 21 to enclose the space above the glass constituents in that portion of the tank. The front end section of the tank is covered by a low flat crown 22. A flue port 23 passes gases to a flue 24 from which they are conveyed to atmosphere by a stack 25. Batch material is introduced through ports 26 and 27 in side walls 14 and 15, as by screw feeders 28 and 29 located so that the batch is introduced immediately above the glass line 21, and floats on the molten glass mass 31 as a blanket 32 of decreasing thickness extending from the rear portion of the rear section of the tank toward the tank front portion.

Molten glass is drawn from the tank discharge region through a throat 33 in front wall 17, and passed along channel 34 to a forehearth (not shown) from which it is utilized in forming the desired product. The flue 24 located in the throat 33 vents the region beneath the low crown portion of the furnace and the throat to atmosphere through stack 25. Skimmer block 35 positioned downstream of the flue extends down into the molten glass flowing through throat 33 to prevent the passage of material on the upper surface of the molten glass mass from the tank into the channel.

The furnace structure is represented in schematic form with much detail omitted. In the side elevations and cross sections it is illustrated as supported above a plant floor 36 by a steel framework 37 from which are also supported various pieces of auxiliary equipment such as burners 38 and combustion air ducts and fuel lines (not shown).

A number of suspended elements are arranged to be raised and lowered with respect to the fixed elements of the furnace by schematically represented block and tackle coupled to the framework 37 as will be discussed below.

Raw materials are charged into the furnace in its rear portion in a charging chamber 39 encompassing a charging region and a melting section or melter of the furnace. The source of the preponderant heat in furnace 11 when reflective heat is utilized to maintain the surface of glass in the refiner molten is illustrated below the surface of the glass, as Joule effect heating by passing current through the molten glass 31 between electrodes 41 of an array distributed over the furnace in a suitable manner to include heating current paths in the melting section of charging chamber 39 and the refining section of discharge chamber 42 which encompasses discharge region. Typically the electrodes 41 are paired in ranks along the furnace length with an outer electrode on one side of the center line connected to an inner electrode on the other side of the center line. Three phase alternating current is utilized as the electrical power with like phases in each rank of electrodes. Control of the current with direct current suppression is by any convenient means such as phase controlled firing of back to back SCRs (not shown) or time proportional control through suitable gating means.

In operation the tank is initially charged with a shallow layer of solid glass constituents which is brought by fossil fuel firing to a molten state and to a temperature such that the negative temperature coefficient of resistivity of the glass brings the resistance between electrode pairs to a level at which sufficient Joule effect heat is developed to overcome thermal losses and provide heat for melting additional solid constituents. Cullet or batch is added until the mass is raised to the glass line 21. This is ordinarily coordinated with the continued fossil fuel firing at a progressively reduced rate and Joule effect heating at a progressively increasing rate. As the tank is filled and fossil fuel firing reduced, the burners are extinguished and their burner ports 43 in breast walls 18 are closed by doors or hatches 44. When full Joule effect heating has been achieved and all burners 38 are extinguished in the charging chamber 39, all burner ports 43 in that chamber are closed and flue port 45 can be closed by door or hatch 46 to close the charging chamber.

The elevating mechanisms for burner port hatches 44 are schematically represented by blocks 47 suspended from furnace support framework 37 and cables 48 extending from the blocks to the hatches. These hatches can be raised and lowered either manually or by power drives (not shown). They can be guided by suitable guides (not shown) between the open position illustrated in FIG. 1 and a closed position in registry with the burner ports 43. Suitable closures can be achieved by arranging the guides to retain the hatches in close proximity to the margins of the ports or by providing baffles (not shown) extending from the walls 18 around the sides of the hatches 44 to check heat loss. Similarly, the flue port 45 can be closed by hatch 46 supported on blocks 49 and cables 51, with guides and baffles for the hatch (not shown).

Batch is fed into the charging chamber 39 at such a rate as to form and maintain a blanket 32 of batch of the surface of the molten glass mass 31. This blanket extends over essentially the entire upper surface of the molten glass as a thermal insulating layer which is thickest near the rear wall 16 of the tank by virtue of the concentration of batch near the feeder ports 26 and 27. Glass currents in the molten mass and the progressive advance of the batch from the feeders develop a flow of batch from the charging region toward the discharge region such that the blanket 32 has an interface 52 with the molten mass which inclines upward toward the discharge chamber 42. Gases evolved in the melting and refining which occurs in charging region flow along this face 52 since the batch blanket 32 impedes their escape to the atmosphere beneath the crown 19 of the charging chamber 39. The reduced or eliminated gas flow into the region beneath crown 19 tends to reduce dusting of the batch particularly in view of the reduced circulation in the atmosphere achieved by the closure of ports 43 and 45 by doors 44 and 46.

In order to enhance the refining of the glass before it is withdrawn from the discharge region of the melt its exposed, upper surface is maintained molten to facilitate the escape of gases evolved from the melt. In FIG. 1 this is done by positioning a reflective refractory crown 22 close to the exposed, upper surface of the glass, typically about two feet above a glass surface of a discharge section 42 having a horizontal expanse of about eight feet by about fourteen feet. Augmenting heat is applied from above the exposed upper surface of the glass by swirl type burners 53 mounted in pockets 54 in the flat face of crown 22 in an array extending across that face. The burners 53 have vertical axes normal to the exposed upper surface of the molten glass and develop a swirl pattern of hot gases which sweep the lower face of the crown 22 with minimum or no direct impingment on the glass. Typically temperatures in the region of crown 22 at the center of its reflective face will be about 2100° F. and the exposed, molten, upper surfaces of the glass will be sufficiently fluid to permit gas to escape the melt freely. It is desirable to maintain an exposed, relatively fluid upper surface of glass over essentially the entire discharge region. This is accomplished by overcoming the heat losses in the discharge region by the added heat of the burners and the foremost rank of electrodes 41.

Figure 7:
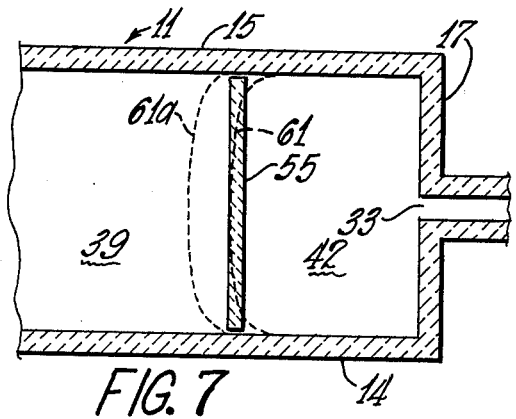
FIG. 7 is a plan view of the discharge region and a portion of the charging region of a furnace according to the invention taken along the line 7—7 of FIG. 1 to show two typical positions of the leading edge of the batch blanket as established by the method and apparatus of the invention; and 61a FIG. 8 is a plot of melter or charging chamber temperture correlated to height of the opening between the charging chamber and discharging chamber when the discharge chamber is maintained at 2100° F and the crown height of the discharge chamber is maintained, all as a function of the heat imposed by the direct firing of fossil fuels in the discharge chamber.

A barrier 55 constrains the heat beneath crown 22 and in discharge chamber 42 to that region. Heat flow from beneath crown 22 of discharge chamber 42 into the region beneath crown 19 of charging chamber 39 can be controlled by adjustment of barrier 55. In FIG. 1 barrier 55 is illustrated as a gate which can be raised and lowered by elevating mechanism represented as cables 56 and blocks 57 suspended from the furnace steel framework 37 to adjust the size of an opening between its lower edge and the upper surface of the underlying glass constituents. The gate passes freely through a suitable aperture 58 in the furnace top between crown 22 and melter end wall 59. It is fitted into aperture 58 to minimize heat loss and is positioned with its lower edge closely adjacent to but spaced from the exposed upper surface of the glass constituents. In operation, this relationship tends to locate the forward extension of the batch blanket, the radiant leading edge 61, to the vicinity of barrier 55. As the gate is raised to release greater heat to the charging region 39, the radiant leading edge retreats toward the rear wall of the furnace as illustrated at 61a shown as a dashed line in FIG. 7.

Figure 8:
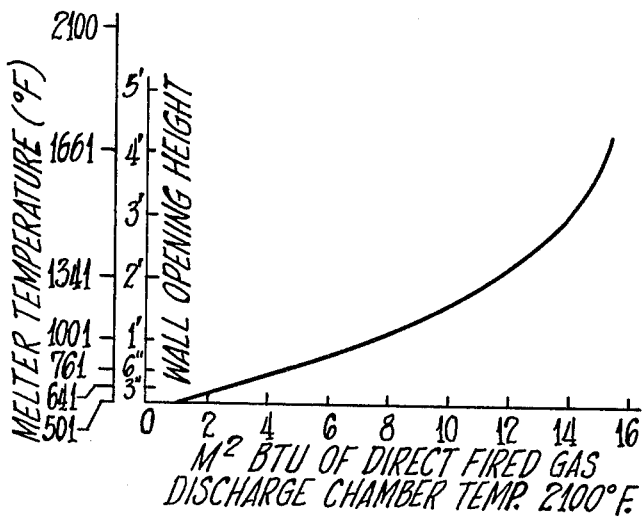

The effect of various spacings of the gate lower edge above the exposed upper surface of the glass constituents is shown in FIG. 8. With the discharge chamber temperature maintained at 2100° F. at the center of the reflective face, the temperature in the charging chamber 39 at the center of the face of crown 19 is about 501° F. with the gate edge at the underlying glass constituent surface. This temperature increases to about 641° F. when the edge is raised three inches above the surface and at these heat transfer conditions two million BTU/hr of fossil fuel firing is required to maintain 2100° F. at the discharge chamber 42 crown. Following the curve, at a 6 inch separation of the gate from the underlying constituents the charging chamber crown is at about 761° F. and about three million BTU/hr of auxiliary heating is required to sustain the temperature in the discharging chamber and at one foot the charging chamber crown is at 1001° F. and about seven and a half million BTU/hr are required. It follows that the greater the added heat and the higher the temperature in region 39 the greater the melting of the exposed upper surface of the glass constituents in the discharge chamber particularly at its forward end.

Some heat release to the space beneath crown 19 is advantageous in that it tends to cause crusting of the batch blanket 32 thereby reducing the amount of dusting in that region. Accordingly, under certain conditions it is desirable to raise the gate 55 between the discharge chamber 42 operated with the exposed, upper surface molten and the charging chamber 39 operated cold top. For example, during start up of the furnace or reheat of a partially cooled furnace the gate 55 can be raised flush with the inner face of crown 22. Where the radiant leading edge of 61 has advanced excessively toward the front end wall 17 additional surface heat can be imposed on that edge by raising the bottom edge a slight amount, of the order of inches, above the now preferred one inch elevation above the glass line to displace the radiant leading edge slightly into the charging chamber as at 61a of FIG. 7. Further where dusting of the batch becomes a problem it may be desirable to admit additional heat to the charging chamber by permitting it to pass the barrier from the discharge chamber.

Figure 5:
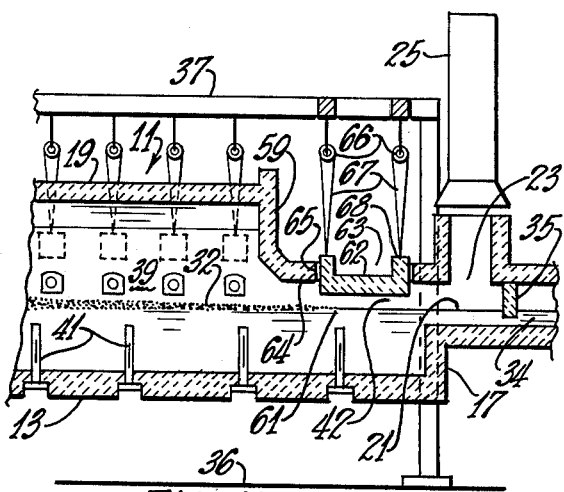
FIGS. 5 and 6 are fragments of sectional side elevation view of modifications from the furnace of FIG. 1 showing the forward end of a furnace including the discharge section according to other embodiments of this invention.

Various approaches to concentration of sufficient heat in the discharge chamber while retaining the advantages of cold top operation in the charging chamber are available within the contemplation of the glass furnace structure and operation method of this invention. For example a gas blast of the nature of an air curtain employing a high temperature gas might be employed as the barrier in place of the gate 55 to limit the amount of heat permitted to flow from the discharge chamber 42 into the charging chamber 39. In FIG. 5 there is shown another arrangement wherein a movable reflective crown 62 can be shifted in its spacing above the glass line 21 to control heat flow to the charging chamber and enhance reflective heating in the discharge chamber.

Figure 2:
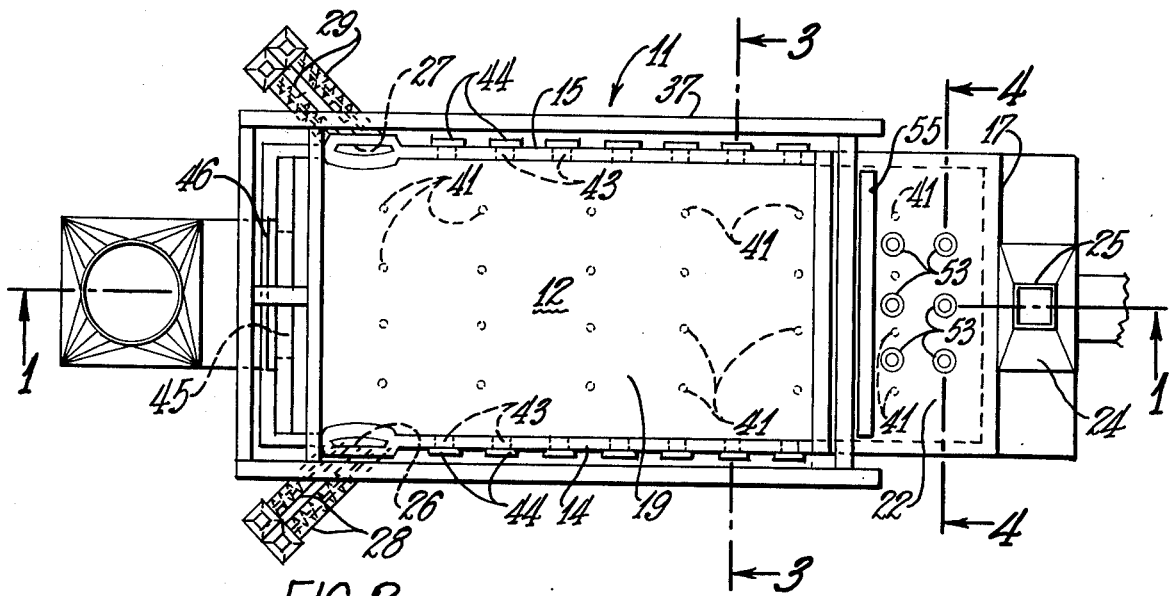
FIG. 2 is a plan view of a diagramatic representation of a continuous glass melting furnace according to this invention.
Figure 3:
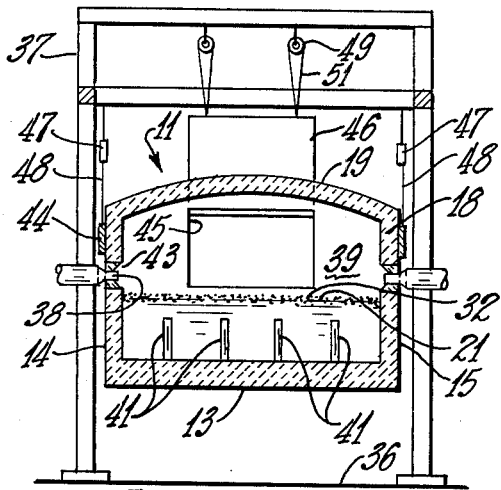
FIG. 3 is a cross-sectionl view of the furnace of FIGS. 1 and 2 taken along line 3—3 of FIG. 2 to show the batch charging section or melter of the furnace.
Figure 4:
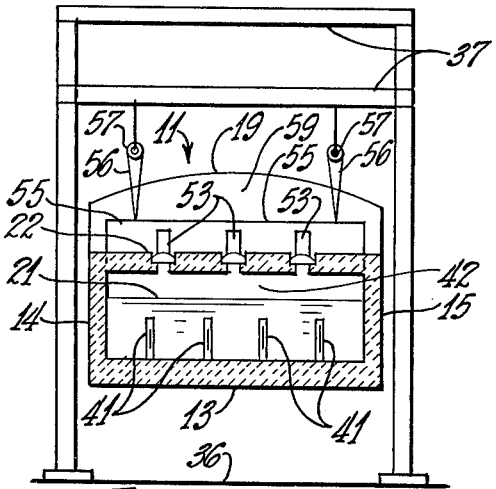
FIG. 4 is a cross-sectional view of the furnace of FIGS. 1 and 2 taken along line 4—4 of FIG. 2 to show the discharge section of the furnace.

The movable crown 62 can be positioned in such proximity to the glass line 21 that its heat reflectivity is sufficient to eliminate the need of the crown mounted burners 53 shown in FIGS. 1, 2 and 4 since sufficient heat reflection from the underlying molten glass can be achieved to maintain the exposed, upper surface of the glass molten and sufficiently fluid to facilitate the release of gas from the melt in the region of the discharge chamber. It is desirable that contact of the molten glass with the refractory of the crown 62 be avoided. Accordingly, while it is contemplated that the confining of the reflective heat and reduction of heat loss in the discharge region is most effective with the crown about one inch above the molten glass upper surface, where the glass circulation is such as to induce spattering or eruptions, as where bubblers are employed or the concentrated Joule effect heating in the vicinity of the electrodes beneath the crown 62 cause such motion, the crown is elevated sufficiently to essentially eliminate its contact with molten glass. In such instances the crown can be several inches above the glass line. Further, at a spacing above the glass intermediate the two foot spacing of the crown 22 and the close spacing of an exclusively reflective crown 62, augmenting heating sources can be introduced between the crown and the glass to provide less heat than provided by the array of swirl burners 53. In these circumstances greater reflective heat is utilized with the lesser augmenting heat sources to maintain the upper surface of the glass molten and define the location of the radiant leading edge.

The structure of the furnace of FIG. 5 generally corresponds to that of the furnace of FIGS. 1-4 except for the modifications to accommodate the movable crown 62. An aperture 63 is provided in the crown 64 above the discharge chamber and has margins 65 closely fitting the movable crown portion 62. Crown 62 is suspended from the steel framework 37 as schematically represented by the blocks 66 and cables 67 for adjustment of its elevation. The movable crown 62 can be provided with suitable guides (not shown) and heat seals (not shown) to facilitate the adjustment of its height and with side wall portions 68 upstanding from flat portion to seal the aperture when the crown is lowered.

Figure 6:
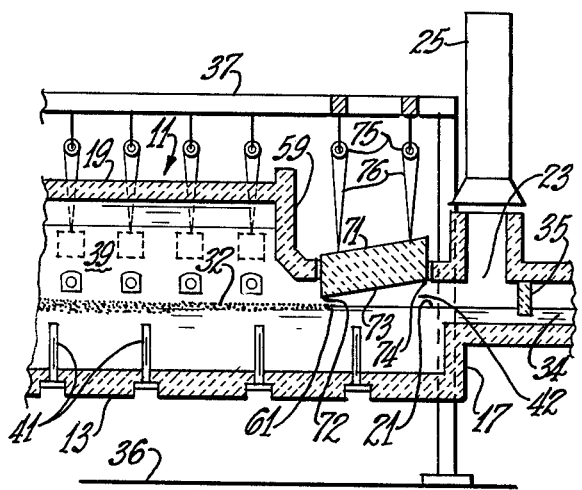

Another embodiment of the reflective crown construction generally similar to FIGS. 1 through 4 and having controlled thermal communication above the glass constituents is shown in FIG. 6. An inclined movable reflective crown 71 has its rear edge 72 most proximate the glass line and its reflective surface 73 divergent to the glass line in the direction of the furnace throat and the flue port 23 of the discharge chamber 42. In this arrangement edge 72 provides the greatest reflection of heat to the upper surface of the glass in chamber 42 while raised front edge 74 and inclined reflective face 73 tends to direct gases to the flue port 23 and control the flow of heat from chamber 42 into chamber 39. This arrangement provides a graduated amount of heat reflection with the least heat reflected back to the melt near the front edge 74. Again adjustment of the elevation of the movable crown 71 is schematically represented by blocks 75 and cables 76 suspended from the furnace framework 37.

The furnace system lends itself to flexible heat energy utilization where supplies of energy vary and Joule effect heating is the under-glass heat source while fossil fuel firing is the above-glass heat source. Under curtailed electrical energy conditions some or all of the burners in the charging section 39 can be employed to apply heat from the upper surface provided the chamber is adequately vented as by opening flue port 45 and suitable firing conditions are maintained. Such operation would reduce the extent of or eliminate the cold top operation, however, the reflective crown can be utilized to advantage in fining the glass in the discharge section even under reduced electrical heating particularly where the electrodes in the discharge section are utilized for the preponderance of heat input to that section. Alternatively, with reduced fossil fuel supplies, the system contemplates the use of reflective heat to maintain the surface fluid, in the discharge section, even to the exclusion of all fossil fuel firing. Accordingly, a wide range of heat source flexibility is afforded in a radiant leading edge type of operation while maintaining the advantages of this type of melting and refining of glass.

It is to be appreciated that various combinations of thermal barriers between the atmospheres above the melter or charging chamber 39 and the refiner or discharge chamber 42 can be utilized with various forms of reflective crowns including inclined or stepped reflective surfaces along the longitudinal axis of the furnace in proximity to the molten glass surface in the discharge chamber. Other forms of receptacles for the glass constituents in batch and molten form can be used. Further various forms of augmenting sources of heat above the glass in the discharge chamber can be provided where reflective heat from the preponderant source of heat, namely the below-glass heaters typified by Joule effect electrodes 41, is insufficient to maintain the glass upper surface sufficiently fluid to permit escape of gases from the melt.

It is, therefore, to be understood that the embodiments shown and discussed are to be read as illustrative of the invention and not in a restrictive sense.

What we claim is:

1. Apparatus for the melting and fining of glass comprising a receptacle for containing glass constituents including molten glass up to a glass line and glass batch above portions of said glass line; a first region in said receptacle adapted to receive glass batch; a second region in said receptacle spaced horizontally from said first region and adapted to have molten glass withdrawn therefrom; a heat source beneath the glass line in said first and second regions adapted to heat the glass; means for distributing glass batch as a blanket over a preponderance of the upper surface of said first region; a heat source beneath the glass line adapted to heat the glass; and a cover for said receptacle to enclose the space above said second region, said cover having a flue for the passage of gas from beneath said cover and said cover being positioned sufficiently close to said glass line so as to reflect heat from within the glass in said second region back to the exposed upper surface of the glass in said second region to increase the fluidity of said surface to an extent to facilitate the escape of gas from said surface in said second region while thermal conditions at the exposed surface of said first region maintain a batch blanket over a preponderance of the upper surface of said first region.

2. Apparatus according to claim 1 wherein said cover is spaced above said glass line of the order of inches.

3. Apparatus according to claim 1 wherein a source of heat energy is located between said cover and the upper surface of the glass constituents beneath said cover.

4. Apparatus according to claim 1 including mechanism to shift the location of said second cover vertically.

5. Apparatus according to claim 1 including a thermal barrier above the glass constituents in said receptacle and between said first region and said second region to inhibit the flow of heat from above said second region to above said first region.

6. Apparatus for the melting and fining of glass comprising a receptacle for containing molten glass up to a glass line and glass batch above said glass line; means for introducing glass batch into said receptacle in a first region and for discharging molten glass from a second region spaced from the first region; a first cover for said receptacle to enclose the space above said first region; heaters beneath the glass line in said first and second regions adapted to heat said glass; a second cover to enclose the space above the second region, said second cover having a flue for the passage of gas from beneath said second cover, said second cover being positioned less than half the height of the first cover above the glass line and being positioned sufficiently close to said glass line so as to reflect heat developed within said molten glass in said second region back to the exposed upper surface of glass in said second region and beneath said second cover to a sufficiently greater extent than heat is reflected back to the exposed upper surface of said first region to heat the surface of said glass in the second region to increase the fluidity of said surface to an extent to promote the escape of gas therefrom while the thermal conditions at the exposed surface of said first region maintain a batch blanket over a preponderance of the upper surface of said first region.

7. Apparatus according to claim 6 wherein said second cover is flat and generally parallel to the surface of the glass beneath it.

8. Apparatus according to claim 7 wherein said first cover is about six feet above the surface of the glass constituents beneath it, said second region has an upper surface about eight feet by about fourteen feet and said second cover is no more than about two feet from the surface of the glass beneath it.

9. Apparatus according to claim 6 wherein a source of heat energy is located between said second cover and the upper surface of the glass constrained beneath said second cover.

10. Apparatus according to claim 6 wherein said second cover has a burner port over said second region; and a burner adapted to develop a swirl type flame is directed through said port to sweep the space between said second cover and the glass constrained beneath said second cover.

11. Apparatus according to claim 10 wherein said second cover is generally horizontal and the burner is oriented to develop a generally horizontal swirl.

12. Apparatus according to claim 6 including mechanism to shift the location of said second cover vertically.

13. Apparatus according to claim 6 wherein said second cover is oriented with its margin proximate said first end closer to said glass line than its margin proximate said discharge end.

14. Apparatus according to claim 13 wherein said second cover is of a heat reflective refractory of generally planar form inclined to the horizontal longitudinally of the furnace.

15. Apparatus according to claim 6 including a thermal barrier between said first region and said second region to inhibit the flow of heat from above said second region to above said first region; and means to control the thermal barrier to control the amount of heat flow.

16. Apparatus according to claim 6 including a partition between said first and second covers extending generally vertically and transverse of a longitudinal axis between said ends of said tank, said partition having a lower margin above and closely adjacent the glass line.

17. Apparatus according to claim 16 including means to shift the elevation of the lower margin of said partition.

18. Apparatus according to claim 6 wherein the elevation of said first cover above said glass line is about three times the elevation of said second cover above said glass line.

19. Apparatus according to claim 6 wherein said first cover is crowned to about 6 feet above said glass line.

20. Apparatus according to claim 6 including a flue from said first region; said sidewalls in said first region having a plurality of burner ports; means to close said flue; and means to close said burner ports.

21. Apparatus according to claim 6 wherein said second cover has a plurality of burner ports over said second region, and a burner for each port adapted to develop a swiry type flame directed to sweep the space between said second cover and the glass constrained beneath said second cover without direct impingement on said glass.

22. Apparatus according to claim 6 wherein the preponderant source of heat for glass in said first region is Joule effect heating developed through electrodes extending through the walls of said tank below said glass line; wherein operating thermal conditions in said first region enable a blanket of batch to be maintained from side wall to side wall above molten glass in a layer extending from said first end wall essentially over said first region; wherein operating thermal conditions in said second region enable a molten glass surface to be maintained from side wall to side wall from said discharge end wall essentially over said second region; and a surface throat extending from said discharge end for withdrawing molten glass free of batch from said tank.

23. The method of operating a continuous glass melting and refining furnace which comprises the steps of applying a preponderance of the heat applied to a body of molten glass beneath the upper surface of that glass; applying glass batch to the mass of glass constituents including the body of molten glass in a charging region remote from a withdrawal region and from a level above the molten glass; distributing glass batch over a substantial portion of the upper surface of the body of molten glass; withdrawing molten glass from the body of molten glass in the withdrawal region adjacent one side of the body; maintaining a heat reflective surface in close proximity above the mass of glass constituents in the withdrawal region to reflect heat to the surface of the mass of glass constituents in thre withdrawal region beneath the heat reflective surface to an extent to maintain the upper surface of the mass of glass constituents beneath the heat reflective surface sufficiently fluid to promote the escape of gas therefrom, to maintain the upper surface essentially free of batch, and to define a leading edge of the batch blanket at its interface with an upper surface of the molten glass generally along the edge of the withdrawal region most proximate said charging region.

24. The method according to claim 23 wherein glass batch is fed from spaced stations along the wall of the tank constraining the glass constituents and is caused to flow across the body of molten glass from the spaced stations and toward the withdrawal region.

25. The method according to claim 23 wherein said heat is developed in the body of molten glass by Joule effect.

26. The method according to claim 23 wherein said substantial portion of the glass surface is about 80% of the upper surface.

27. The method according to claim 23 wherein the molten glass is withdrawn at the upper surface of the molten glass body.

28. The method according to claim 23 including the step of enclosing the upper surface of the mass of glass constituents in the charging region whereby gas currents and dust escape from the charging region are minimized.

29. The method according to claim 28 including the step of maintaining the enclosing surfaces above the batch blanket sufficiently remote from the batch blanket upper surface that the temperature in the major portion of the charging region is below that at which the glass batch melts.

30. The method according to claim 23 including the step of controlling the amount of heat transmitted from the withdrawal region of the charging region to melt at least a portion of the upper surface of batch along the leading edge of the batch blanket.

31. The method according to claim 30 wherein the controlling of transmitted heat is by the positioning of a heat barrier between the withdrawal region and the charging region.

32. The method according to claim 31 wherein the heat barrier is a wall having a lower edge positioned above the molten glass upper surface and including the step of adjusting the heat transmitted by adjusting the height of the lower edge of the barrier wall above the exposed, upper surface of the glass constituents.

33. The method according to claim 32 including the step of adding heat from a source other than the Joule effect heating of the molten glass to the withdrawal region from above the exposed upper surface of the glass constituents.

34. The method according to claim 23 including the step of venting the withdrawal region from above the upper surface of the molten glass.

35. The method according to claim 23 wherein the general temperature below the reflective surface and above the upper surface of glass constituents withdrawal region is about 2100° F. and including the steps of enclosing the upper surface of the mass of glass constituents in the charging region and adjusting the heat transmitted from the withdrawal region to the charging region as a function of the height of the lower edge of the barrier wall in the relationship over the height range of one inch to two feet and a general temperature within the enclosure above the upper surface of glass constituents in the charging region in the range of about 500° to 1340° F. respectively.

36. The method according to claim 23 including the step of adjusting the amount of heat reflected to the upper surface of the glass constituents in the withdrawal region from the heat reflective surface.

37. The method according to claim 36 wherein the step of adjusting the amount of heat reflected includes adjusting the height of the reflective surface above the upper surface of the glass constituents.

38. The method according to claim 23 including the step of controlling the location of the leading edge of the batch blanket by positioning the heat reflective surface closer to the upper surface of the mass of glass constituents along the side of said heat reflective surface most proximate the charging region than along the side most remote from the charging region.

39. The method of operating a continuous glass melting and refining furnace having a charge and discharge region wherein a batch blanket is maintained on the upper surface of the glass constituents in the charge region and the upper surface of the glass constituents in the discharge region is molten glass which comprises the steps of applying a preponderance of the heat applied in the charge and discharge regions to the mass of glass constituents by Joule effect; augmenting the Joule effect heat with heat directed toward the upper surface of the glass mass in the discharge region from above that upper surface; imposing a barrier to heat flow between the space above the discharge region and the space above the charge regions; and adjusting the location of the leading edge of the batch blanket proximate to the discharge region by adjusting the flow of heat past the barrier from the space above the upper surface of the glass mass in the discharge region to the space above the upper surface of the glass in the charge region.

40. The method according to claim 34 wherein the barrier is a wall having a lower edge proximate the upper surface of the mass of glass constituents and wherein the step of adjusting involves adjusting the height of the lower edge of the wall above the upper surface of the mass of glass constituents.

* * * * *